US010260664B2

(12) United States Patent
Richardson et al.

(10) Patent No.: US 10,260,664 B2
(45) Date of Patent: Apr. 16, 2019

(54) PIPE END SEAL ASSEMBLY

(71) Applicant: Actuant Corporation, Menomonee Falls, WI (US)

(72) Inventors: Martin E. G. Richardson, West Midlands (GB); Bryan R. Hall, Newport (GB)

(73) Assignee: Actuant Corporation, Menomonee Falls, WI (US)

( * ) Notice: Subject to any disclaimer, the term of this patent is extended or adjusted under 35 U.S.C. 154(b) by 585 days.

(21) Appl. No.: 14/773,891

(22) PCT Filed: Mar. 14, 2014

(86) PCT No.: PCT/US2014/028181
§ 371 (c)(1),
(2) Date: Sep. 9, 2015

(87) PCT Pub. No.: WO2014/152904
PCT Pub. Date: Sep. 25, 2014

(65) Prior Publication Data
US 2016/0018032 A1    Jan. 21, 2016

Related U.S. Application Data

(60) Provisional application No. 61/782,775, filed on Mar. 14, 2013.

(51) Int. Cl.
*F16L 23/16* (2006.01)
*F16L 1/26* (2006.01)
*F16L 23/024* (2006.01)

(52) U.S. Cl.
CPC .............. *F16L 23/16* (2013.01); *F16L 1/26* (2013.01); *F16L 23/024* (2013.01); *F16L 2201/30* (2013.01)

(58) Field of Classification Search
CPC ......... F16L 23/02; F16L 23/032; F16L 23/16; F16L 23/18; F16L 1/26; F16L 2201/30;
(Continued)

(56) References Cited

U.S. PATENT DOCUMENTS 2,032,492 A * 3/1936 Nathan ................. F16L 17/025
277/615
4,346,922 A * 8/1982 Ohtsuga .................... 285/110 X
(Continued)

FOREIGN PATENT DOCUMENTS

EP    1164325    10/2005
EP    2505897    10/2012
(Continued)

OTHER PUBLICATIONS

International Search Report and Written Opinion for Application No. PCT/US2014/028181 dated Jul. 31, 2014 (9 pages).
(Continued)

*Primary Examiner* — Greg Binda
*Assistant Examiner* — Zachary T Dragicevich
(74) *Attorney, Agent, or Firm* — Michael Best & Friedrich LLP

(57) ABSTRACT

An end seal assembly configured to seal with a pipe. The seal assembly may include a cylindrical finned insert including an insert portion to be received in the pipe and a base portion at least partially facing the end face of the pipe, the insert portion having at least one annular fin extending radially outwardly, a pocket being formed between the at least one annular fin and the base portion, the at least one annular fin being deformable against the inner surface of the pipe; and a malleable annular end seal positioned near the pocket, the end seal being axially compressed between the base portion and the end face of the pipe and flowing around the end face to the inner surface of the pipe and into the
(Continued)

pocket to inhibit fluid from passing from the inner surface of the pipe to the end face of the pipe.

27 Claims, 8 Drawing Sheets

(58) Field of Classification Search
CPC ....... F16L 17/025; F16L 23/024; F16L 21/03; F16L 21/04
USPC ........ 285/110, 112, 113, 412, 368, 108, 109, 285/347, 348, 349, 375; 277/529, 603, 277/615
See application file for complete search history.

(56) References Cited

U.S. PATENT DOCUMENTS

| | | | |
|---|---|---|---|
| 4,398,726 A * | 8/1983 | Heisler | ......................... 277/615 |
| 5,062,667 A | 11/1991 | Miller et al. | |
| 5,110,144 A * | 5/1992 | Burton | ...................... 277/615 X |
| 6,106,030 A * | 8/2000 | Nader | ..................... F16L 23/16 |
| | | | 285/368 X |
| 6,726,253 B2 | 4/2004 | Inoue et al. | |
| 2011/0109082 A1 | 5/2011 | Karoliussen | |
| 2011/0210543 A1* | 9/2011 | German | |

FOREIGN PATENT DOCUMENTS

| GB | 2115094 | 9/1983 |
|---|---|---|
| KR | 20110006503 | 6/2011 |

OTHER PUBLICATIONS

EP14767951.8 Extended European Search Report dated Nov. 8, 2016 (10 pages).

* cited by examiner

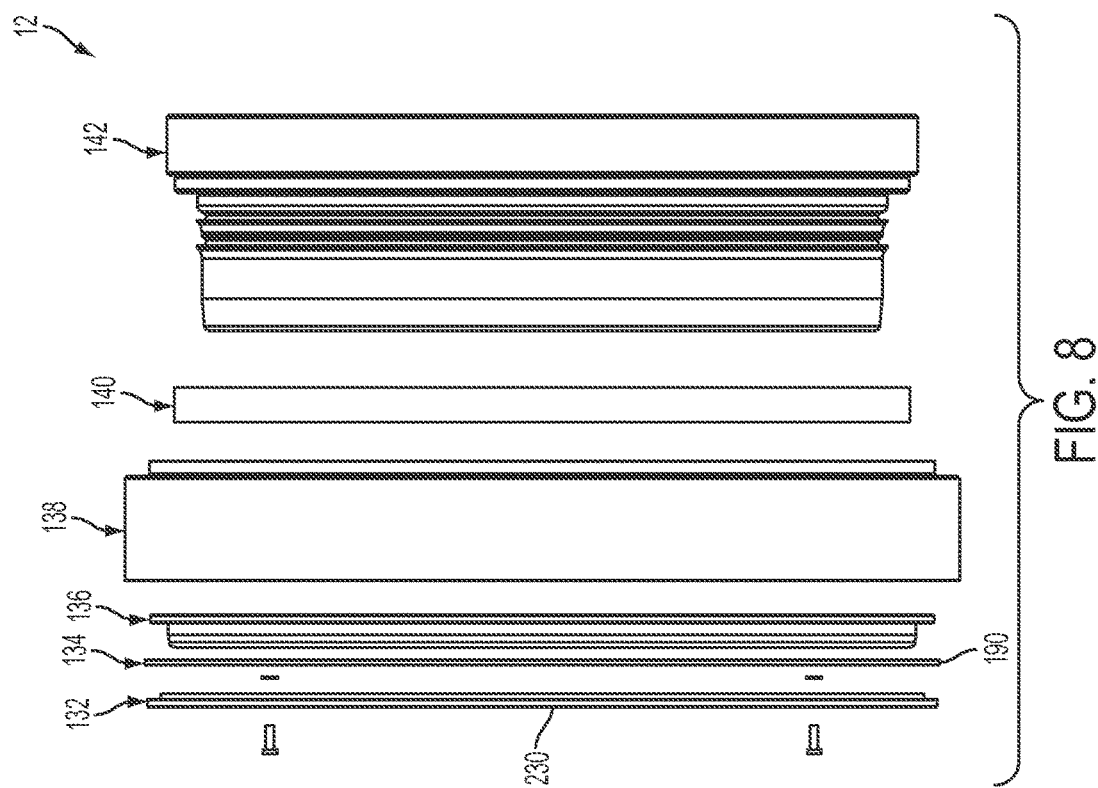
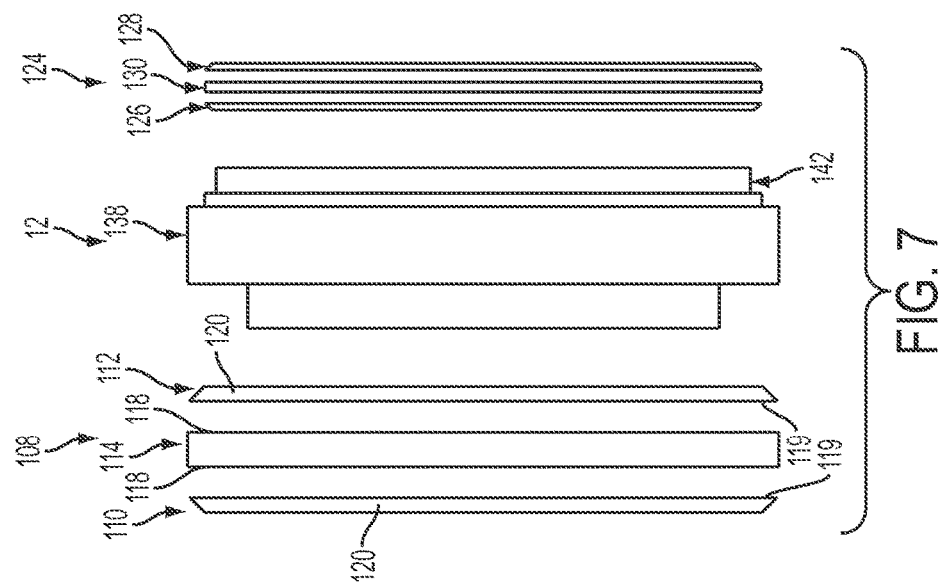

PIPE END SEAL ASSEMBLY

RELATED APPLICATION

The present application claims priority to co-pending U.S. Provisional Patent Application No. 61/782,775, filed Mar. 14, 2013, the entire contents of which is hereby incorporated by reference.

FIELD

The present invention relates to pipe end seal assemblies and, more particularly, to pipe end seal assembly with a sealing arrangement that inhibits degradation of a pipe end face

BACKGROUND

Pipelines are employed in varied environments to carry many different types of media. For instance, pipelines can be located in both topside and subsea environments and may carry media ranging from portable water to petroleum-based gases and liquids. The pipes used in the pipeline are typically made of carbon steel, stainless steel, or a duplex, and can have diameters on the order of ½ inch to greater than 42 inches. Furthermore, pressures within the pipeline can approach and exceed approximately 9000 psi.

One particularly harsh application involves subsea pipelines. These pipelines are subjected to extreme environmental and operational conditions and, in some situations, are lined or clad with a corrosion resistant alloy ("CRA") to inhibit degradation of the main carrier pipe by gases, including hydrogen sulfide. Problems occur when a subsea CRA clad/lined pipeline develops a leak. Practicality often dictates that the pipeline be repaired in the subsea environment, which may require use of a costly and complex hyperbaric welding process. Depending on the subsea depth of the pipeline, repair by a human diver may not be possible, which may require some type of robotic tool to repair the leaking pipeline.

MORGRIP connectors, manufactured by Hydratight Limited, have proven to be a viable solution to repairing leaks in non-CRA clad/lined subsea pipelines. When a leak in the pipeline is detected, the damaged section is cut and removed from the pipeline. The appropriate MORGRIP connectors are then installed onto the cut ends of the pipe. Finally, a splice or spool piece is positioned between and secured to the MORGRIP connectors to reestablish a leak-free pipeline.

Typical mechanical connectors, however, do not fully inhibit media flowing within the pipeline from coming into contact with the bare end faces of the cut pipes. Therefore, potentially damaging media may interact with the bare ends and degrade the pipe, ultimately reducing the integrity of any repair and associated mechanical connector. A mechanical connector used to repair a subsea CRA clad/lined pipeline should inhibit the media within the pipe from interacting with the unprotected ends of the cut pipe and, in CRA lined applications, further being interspersed between the inner wall of the carrier pipe and the outer wall of the CRA lining. This requirement is further complicated by tolerances of the inner diameter, outer diameter, and wall thickness of the pipe, irregularities in the roundness of the pipe, and additional imperfections related to the orientation of the cut end face relative to the axis of the pipe. Moreover, thermal dynamics factors must be accounted for because thermal expansion and contraction coefficients of each component can impact the operational characteristics and performance of the overall connector. From a business standpoint, a mechanical connector should not excessively reduce the media flow through the repaired pipeline, require minimal costly pipe preparation, and avoid further damaging the pipeline during the repair.

In light of at least the above design considerations and the challenges presented by them, a need exists for an improved pipe end connector that reduces the potential for degradation of cut pipe ends.

SUMMARY

In one independent aspect, a pipe end connector assembly is configured to mount to an outer surface of a pipe near an axial end face of the pipe. The connector assembly comprises a cylindrical connector body having at least one gripping segment that is configured to selectively mount to the outer surface of the pipe. A first end plate and a second end plate are positioned at opposite ends of the connector body. At least one tension member is coupled to the first end plate and the second end plate such that manipulation of the tension member can draw the first end plate and the second end plate toward each other compressing the connector body to mount the at least one gripping element to the pipe. An end seal is engaged with the first end plate and is configured to abut and seal with the axial end face of the pipe and the first end plate. A primary seal is engaged with the connector body and is positioned between the end seal and the second end plate. The primary seal is configured to abut and seal with the outer surface of the pipe and the connector body.

In another independent aspect, an end seal assembly is configured to seal with a pipe having an axial end face and an inner surface. The seal assembly comprises a cylindrical finned insert having a base portion and a radially thinner insert portion. The finned insert has at least one annular fin that extends radially outward from the insert portion. A cylindrical pocket is formed in the finned insert between the at least one annular fin and the base portion. A cylindrical twin seal insert is positioned radially outward. A cylindrical end fin insert is coupled to the twin seal insert, and the end fin insert has an annular lip that extends axially and radially inward. A malleable cylindrical end seal is positioned near the pocket and between the finned insert and the annular lip of the end fin insert. When the insert portion of the finned insert is axially inserted into engagement with the inner surface of the pipe, the axial end face and the inner surface of the pipe engage and deform the at least one annular fin of the finned insert and the annular lip of the end fin insert in an axially and radially inward direction, such that the malleable end seal is urged into the pocket by the annular lip thereby defining a seal that inhibits fluid from passing from the inner surface of the tube to the axial end face of the tube.

These and still other independent aspects will be apparent from the description that follows. In the detailed description, preferred example embodiments will be described with reference to the accompanying drawings. These independent embodiments do not represent the full scope of the concept; rather the concept may be employed in other independent embodiments. Reference should therefore be made to the claims herein for interpreting the breadth of the invention.

BRIEF DESCRIPTION OF THE DRAWINGS

FIG. 7 is a simplified, partial exploded plan view of an example primary seal assembly, the example pipe end seal assembly, and an example plate seal assembly shown in FIG. 1.

FIG. 8 is an exploded plan view of the example pipe end seal assembly shown in FIG. 1.

DETAILED DESCRIPTION

The concepts described below and shown in the accompanying figures are illustrative of an example implementation of the inventive concepts; however, when given the benefit of this disclosure, one skilled in the art will appreciate that the inventive concepts described herein can be modified and incorporated into many other applications. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

Figure 1:
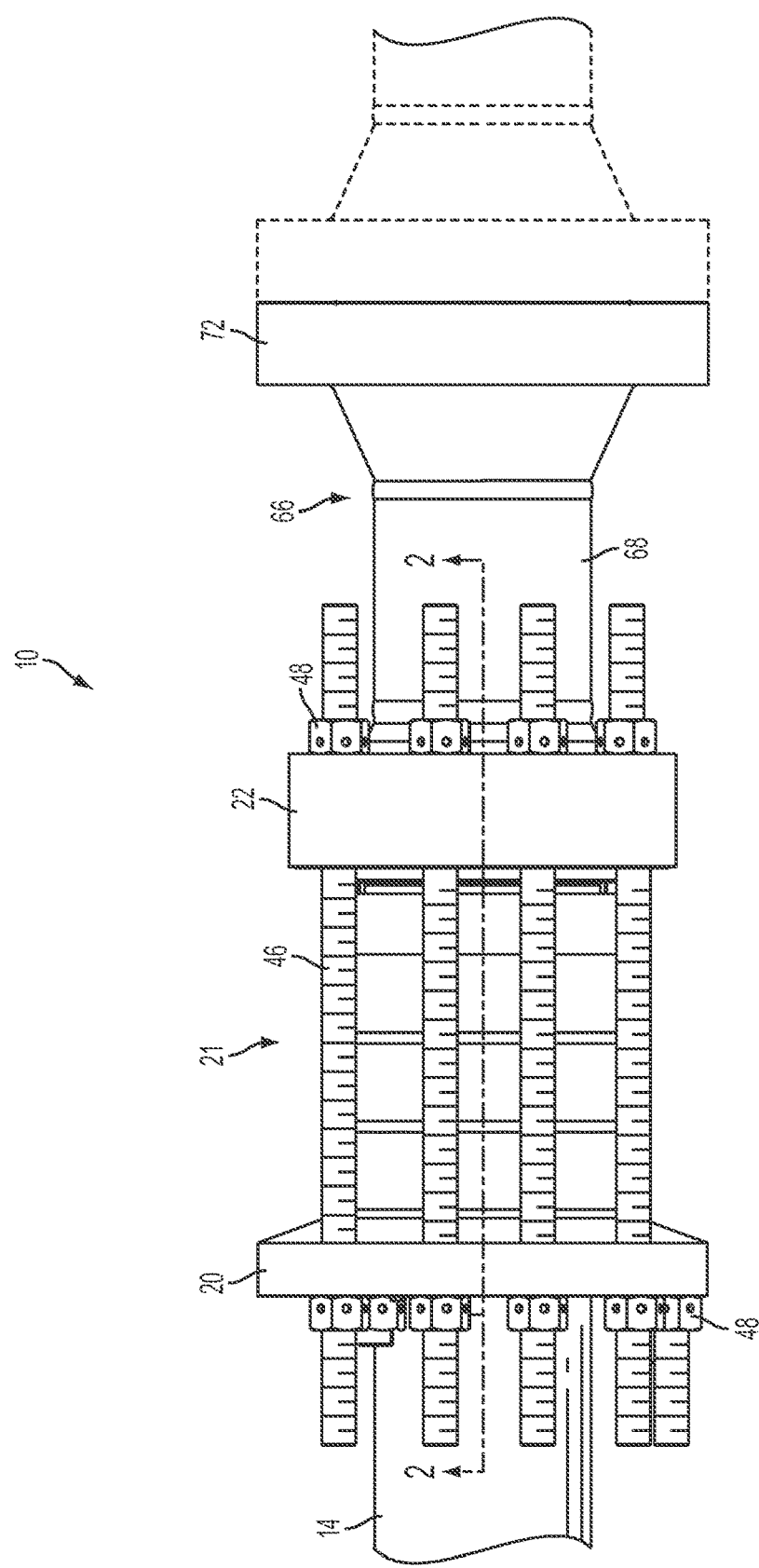
FIG. 1 is a plan view of an example pipe end connector assembly coupled to an example pipe.
Figure 2:
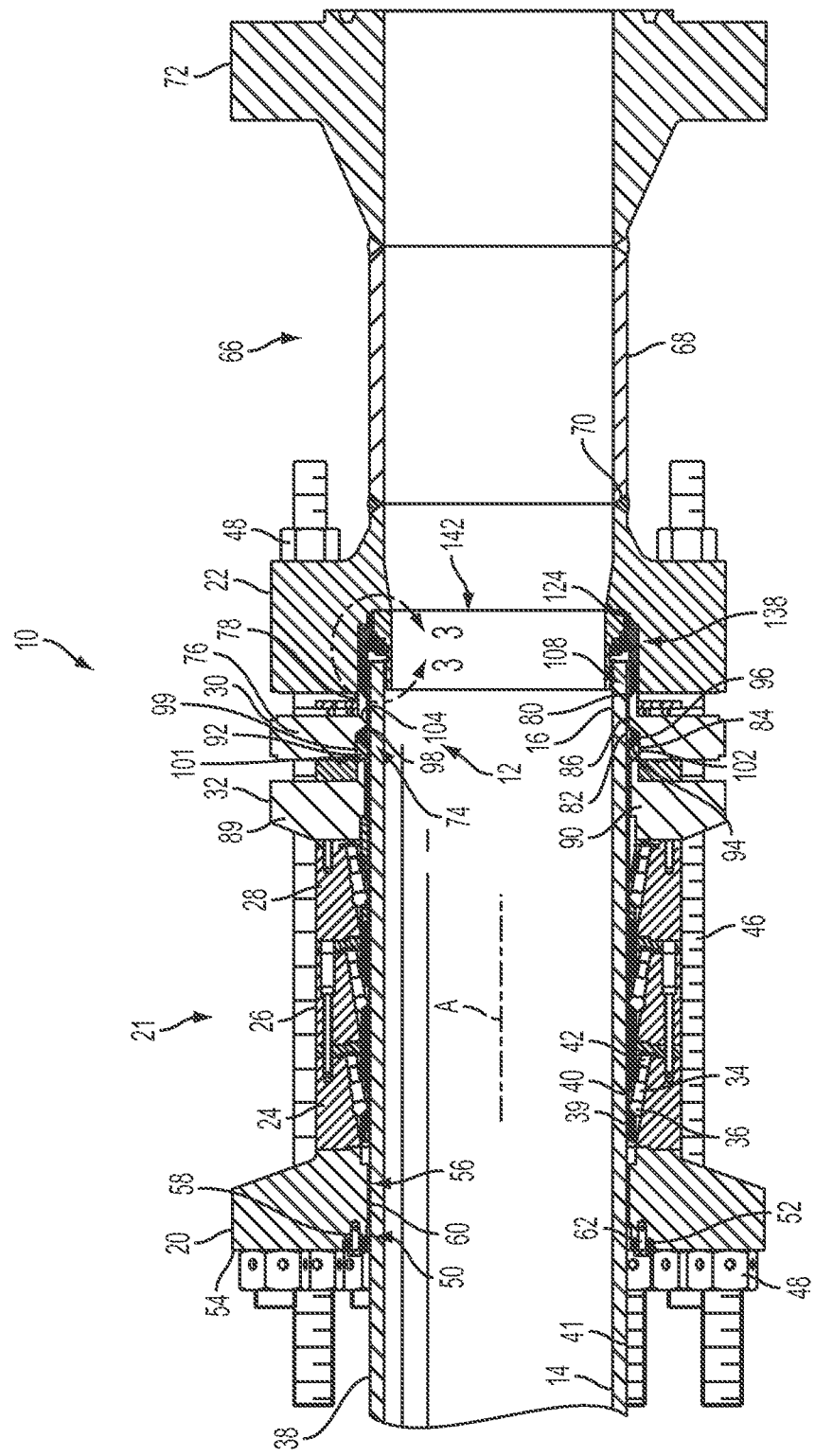
FIG. 2 is a partial cross section of the example pipe end connector assembly along line 2-2 shown in FIG. 1.

An example pipe end connector assembly 10 ("connector assembly 10") is depicted in FIGS. 1 and 2. The basic construction of the connector assembly 10 is in accordance with the commercially available line of MORGRIP Subsea Connectors manufactured by Hydratight Limited. The features of the connector assembly 10 have been modified to incorporate an example embodiment of a pipe end seal assembly 12.

After a pipe 14 has been cut, the connector assembly 10 is slid over the cut end 16 and positioned adjacent to an axial end face 18 of the pipe 14. The connector assembly 10 is coupled to the pipe 14 in a similar manner to that used by the typical MORGRIP device. Specifically, the connector assembly 10 includes a pair of disc-shaped end plates 20, 22 that sandwich a connector body 21 having a series of gripping segments 24, 26, 28, an annular primary ring 30, and an annular secondary ring 32. Each of the gripping segments 24, 26, 28 is generally ring-shaped and includes a series of circumferentially spaced passageways 34 that are skewed relative to the central axis A. A ball 36 is positioned in each of the passageways 34 and restrained by an annular cage segment 39 defining a series of circumferential openings 40 into which each ball 36 is seated. Each gripping segment 24, 26, 28 includes a respective and aligned cage segment 39. A biasing member 42 (e.g., a spring) is seated in each passageway 34 to urge the respective ball 36 into engagement with the exterior surface 38 of the pipe 14.

Each of the end plates 20, 22 also includes circumferentially spaced holes (not shown), and each hole is adapted to receive one end of a tension member, such as a main stud bolt 46. Nuts 48 are engaged with opposite ends of each main stud bolt 46 such that rotating the nuts 48 creates tension within the main stud bolts 46 to draw the end plates 20, 22 together. As the end plates 20, 22 move toward each other, the gripping segments 24, 26, 28 are axially compressed causing the balls 36 to deform and wedge into the exterior surface 38 of the pipe 14, thus coupling the connector assembly 10 to the pipe 14.

An environmental seal assembly 50 is incorporated into a recess 52 formed in an axial end face 54 of the end plate 20. Specifically, the environmental seal assembly 50 includes an annular environmental seal 56 having an L-shaped cross section with a radially extending leg 58 and an axial extending leg 60 that extends adjacent to the exterior surface 38 of the pipe 14. A series of bolts 62 secure the environmental seal 56 to the end plate 20. The environmental seal assembly 50 accounts for variations in the exterior surface 38 of the pipe to inhibit environmental contaminants (e.g., seawater) from passing between the exterior surface 38 of the pipe and an annular interior surface 64 of the end plate 20 where it may foul the internal components of the connector 10.

A flange adaptor 66 is secured (e.g., welded) to the other end plate 22. The end plate 22 includes a cylindrical collar 68 that is welded at one end to an axial end face 70 of the end plate 22, and is welded to a pipe flange 72 at the opposite end. As part of a repair procedure, the pipe flange 72 would be coupled (e.g., bolted) to a spool segment, which is a tube with pipe flanges on each end. The opposite end of the spool segment in turn may be coupled to another connector assembly (substantially identical to the connector assembly 10) that is secured to another cut end of the original pipeline. While the connector assembly 10 is illustrated as a pipe-to-flange adaptor, it may alternatively be constructed as, for example, a pipe-to-pipe coupling, a pipe-to-weld adaptor, a pipe-to-blind end cap, or any other configuration required by the particular application.

As part of the installation process, various seal assemblies of the connector assembly 10 are positioned, engaged, and energized to inhibit undesirable movement of internal media and external environment, in addition to the environmental seal assembly 50 discussed above. With continued reference to FIG. 2, a secondary seal assembly 74 is positioned adjacent to the exterior surface 38 of the pipe 14 and axially between the primary ring 30 and the secondary ring 32. The primary ring 30 has a generally L-shaped axial cross section with a disk body 76 and a primary finger 78 radially inward that extends axially from the disk body 76 and is positioned adjacent to the pipe 14. The primary finger 78 includes a distal beveled face 80 at a distal end of the primary finger 78 and an opposite proximal beveled face 82. An annular undercut 84 is formed in a radially inward face 86 to house the secondary seal assembly 74.

The secondary ring 32 has a similar form factor as the primary ring 30. Specifically, the secondary ring 32 has a generally L-shaped axial cross section with a disk body 89 and a secondary finger 90 that extends axially from the disk body 89 adjacent to the pipe 14. However, the secondary finger 90 only has a distal beveled face 92 at a distal end of the secondary finger 90.

As the end plates 20, 22 are drawn together, the primary ring 30 and the secondary ring 32 translate toward each other, such that the secondary seal assembly 74 is compressed. Spacer rings (not shown) may be positioned adjacent one or more of the primary ring 30 and the secondary ring 32 to reduce the occurrence of excessive ring translation and over-compression of any of the various seals.

The secondary seal assembly 74 includes a pair of anti-extrusion rings 94, 96 that sandwich a central secondary seal member 99. Each anti-extrusion ring 94, 96 is preferably metallic and includes a split to allow radial compression (not shown) having opposing circumferential ends that are skewed relative to the central axis A. The anti-extrusion rings 94, 96 have a triangular cross section that defines an interior surface 98 positioned adjacent to the exterior surface 38 of the pipe 14, a radial surface 101 generally slightly less than perpendicular (e.g., about 85 degrees) to the interior surface 98 that is axially engaged with an axial face 102 of the secondary seal member 99, and a hypotenuse surface 104 connecting the interior surface 98 and the radial surface 101.

The hypotenuse surface 104 of the rightmost anti-extrusion ring 96 is contoured to engage and wedge against the beveled face 82 of the primary finger 78 as the end plates 20, 22 are drawn together. The leftmost anti-extrusion ring 94 is engaged with the distal beveled face 92 of the secondary finger 90. Therefore, the anti-extrusion rings 94, 96 compress the secondary seal member 99 such that the secondary seal member 99 flows radially between the exterior surface 38 of the pipe 14 and the inward face 86 of the primary ring 30 to form a seal between the pipe 14 and the primary ring 30. The anti-extrusion rings 94, 96 keep the material of the secondary seal member 99 where it can be compressed and hardened to establish the desired seal.

The secondary seal member 99 is made of a malleable and compressible material, such as exfoliated graphite. In one form, the secondary seal member 99 is made of approximately 98% pure exfoliated graphite that is a laminate graphite sheet or ribbon spun or spiral wound around a mandrel into a mold that can be subsequently manipulated into the installed form factor.

With additional reference to FIG. 7, a primary seal assembly 108 is constructed substantially identical to the secondary seal assembly 74 described above and shown in enlarged views. The primary seal assembly 108 also includes a pair of split anti-extrusion rings 110, 112 that sandwich a central primary seal member 114. The anti-extrusion rings 110, 112 have a triangular cross section that defines an interior surface 116 positioned adjacent to the exterior surface 38 of the pipe 14, a radial surface 119 generally slightly less than perpendicular to the interior surface 116 that is axially engaged with an axial face 118 of the primary seal member 114, and a hypotenuse surface 120 connecting the interior surface 116 and the radial surface 119.

Contrary to the secondary seal assembly 74, the hypotenuse surface 120 of the leftmost anti-extrusion ring 110 is contoured to engage and wedge against the distal beveled face 80 of the primary finger 78 as the end plates 20, 22 are drawn together. Moreover, the hypotenuse surface 120 of the rightmost anti-extrusion ring 112 is engaged with a pipe end seal assembly 12, which is described below.

A plate seal assembly 124 is also illustrated in FIG. 7. The plate seal assembly 124 is also similar to the primary seal assembly 108 and the secondary seal assembly 74. Specifically, while sized to fit into the design envelope within the end plate 22, a pair of annular anti-extrusion rings 126, 128 sandwich a plate seal member 130 that is also circular. The anti-extrusion rings 126, 128 perform a similar function in compressing the end plate seal member 130 and guiding the malleable plate seal member 130 in a generally radial direction.

Turning to FIGS. 3, 8, 9, and 12-14, the structure and construction of the example pipe end seal assembly 12 is described in greater detail, with the understanding that many of the relative descriptions reference cross sections of generally annular components. With initial reference to FIGS. 8 and 9, the pipe end seal assembly 12 includes a packing ring retainer 132, a packing ring 134, an end fin insert 136, a twin seal insert 138, an end seal 140, and a finned insert 142, each of which are substantially annular in overall form.

Figure 3:
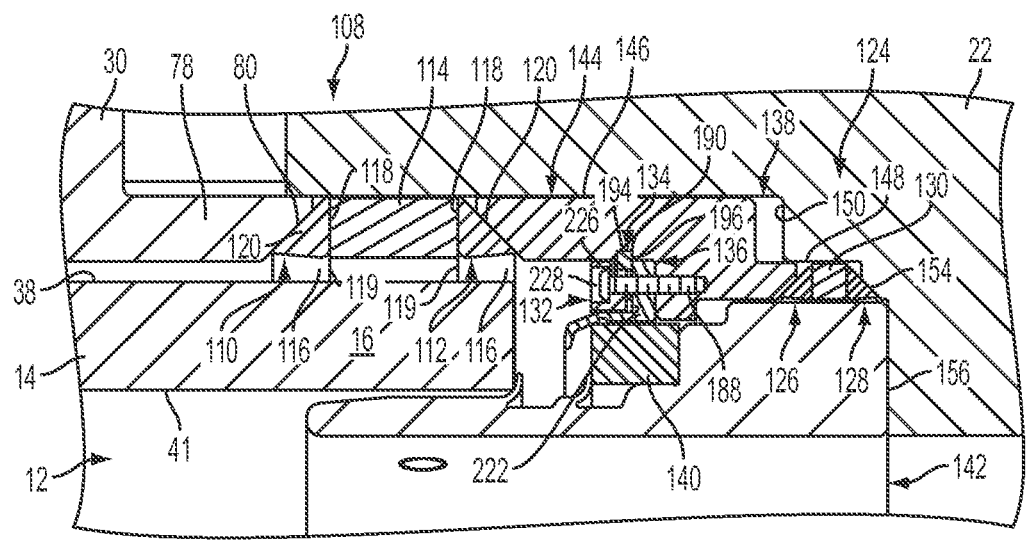
FIGS. 3-6 are detail plan views of the portion circumscribed by arc 3-3 shown in FIG. 2 during installation stages of the example pipe end connector incorporating an example pipe end seal assembly.

The example pipe end seal assembly 12 is installed into a stepped annular bore 144 that is formed in the end plate 22 (best illustrated in FIG. 3). The bore 144 includes three main portions of varying cross section profile. Specifically, the bore 144 has an annular surface 146 that is parallel to the central axis A. The surface 146 transitions to an intermediate surface 148 at an axial face 150 that is perpendicular in cross section to the surface 146 and the intermediate surface 148. The intermediate surface 148 transitions to a skewed surface 154 that is angled radially inward toward an inner axial face 156. The bore 144 may be adapted to accept various pipe end seal assemblies of varying construction and form factor.

The twin seal insert 138 is generally contoured to slidably engage the bore 144 in the end plate 22. The twin seal insert 138 (best shown in FIG. 13) has an annular outer surface 158 that engages the annular surface 146. A first end 160 of the twin seal insert 138 includes an annular end face 161 and a beveled face 162. An annular inner surface 166 is generally parallel to the outer surface 158 and includes an annular groove 168 that is sized to receive a portion of the packing ring 134, described below.

Another annular end face 170 is generally parallel to the end face 161. An annular finger 172 extends axially away from the end face 170 and has a distal end forming an axially skewed engagement face 174 that is configured to abut and wedge with the anti-extrusion ring 126 of the end plate seal assembly 124. The finger 172 also defines an annular face 176 forming a recess 178 that terminates at an axial surface 180 oriented generally perpendicular to the central axis A. The axial surface 180 extends radially inward toward an annular surface 182 that extends axially between the axial surface 180 and a parallel axial surface 184. A series of threaded bores 186 are formed in the axial surface 184 to receive bolts 188 used to secure the packing ring retainer 132, the packing ring 134, and the twin seal insert 138.

The packing ring 134 is an annular ring having a generally square cross section and may include chamfered corners and be made of several arcuate, metallic segments (e.g., four steel segments). The packing ring 134 has an annular outer surface 190 that is opposite to an annular inner surface 192, and a first axial face 194 that is parallel to a second axial face 196. A portion of the packing ring 134 is seated into the annular groove 168 in the twin seal insert 138.

Figure 12:
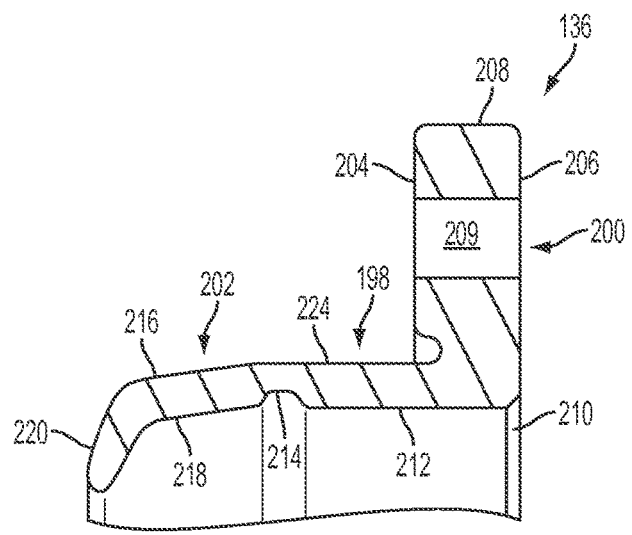
FIG. 12 is a cross section view of an example end fin insert.
Figure 13:
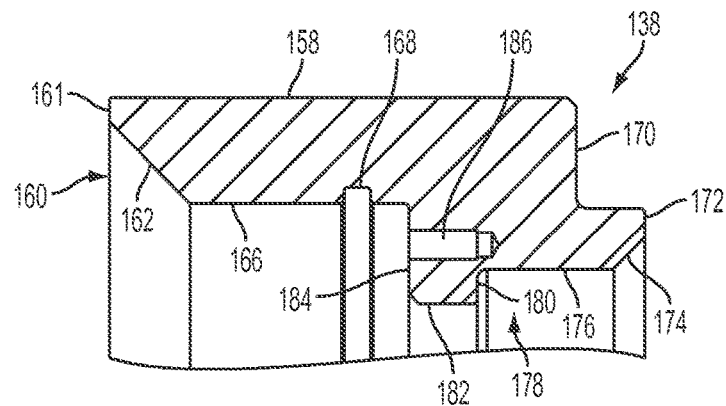
FIG. 13 is a cross section view of an example twin seal insert.

With specific reference to FIG. 12, the end fin insert 136 includes a cylindrical collar portion 198, an annular flange portion 200 that extends radially outward from the collar portion 198, and an annular lip portion 202 that extends both axially and radially inward from the collar portion 198. The flange portion 200 includes opposing axial end faces 204, 206 and several through holes 209 that are used to allow the end fin insert 136 to be installed via the bolts 188. The axial end face 206 abuts the axial surface 184 of the twin seal insert 138 and an annular outer surface 208 abuts the inner surface 166 of the twin seal insert 138. A beveled surface 210 is formed between the end face 206 and an annular inner surface 212 of the collar portion 198.

An annular recess 214 is formed in the inner surface 212 between the collar portion 198 and the lip portion 202. The recess 214 establishes a pivot location, such that during installation of the pipe 14 (described below), the lip portion 202 can bend radially inward relative to the collar portion 198 toward the central axis A. The distal end of the lip portion 202 is curved or bent radially inward toward the central axis A, defining a generally axial outer surface 216 and generally axial inner surface 218 connected by an arcuate tip surface 220.

As shown in FIG. 3, the annular packing ring retainer 132 is engaged by the bolts 188 to couple the packing ring 134 and the end fin insert 136 to the twin seal insert 138. A series of countersunk holes 228 are formed in an axial end face 230 to accommodate the bolts 188. As best shown in FIG. 8, the packing ring retainer 132 has a stepped profile. The packing ring retainer 132 has an annular inner surface 222 that is installed adjacent to an annular outer surface 224 of the collar portion 198 of the end fin insert 136. An annular outer surface 226 is positioned adjacent to the inner surface 166 of the twin seal insert 138.

Figure 14:
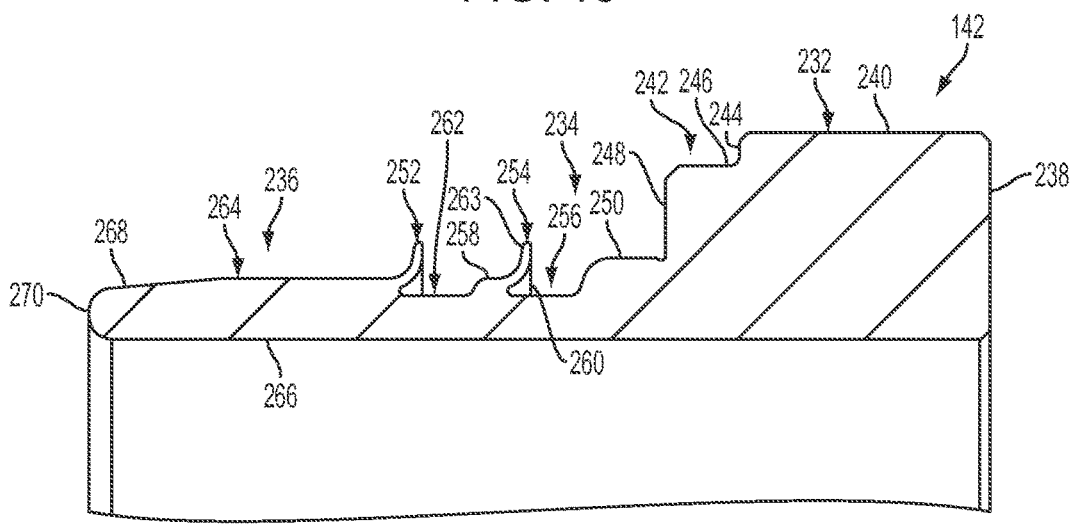
FIG. 14 is a cross section view of an example finned insert.

With specific reference to FIG. 14, the finned insert 142 includes a base portion 232, an intermediate portion 234, and an insert portion 236. The base portion 232 is generally rectangular in cross section and defines an axial end face 238 that is perpendicular to an annular outer surface 240. The end face 238 is installed adjacent to the inner axial face 156 of the bore 144 in the end plate 22. The outer surface 240 of the finned insert 142 engages the plate seal assembly 124 and is nested in the recess 178 formed by the twin seal insert 138. The base portion 232 includes an annular notch or step 242 with an annular axial face 244 and an annular cylindrical surface 246 that is configured to match the contours of the axial surface 180 and the annular surface 182 of the twin seal insert 138. The intermediate portion 234 has an axial face 248 and a radial face 250 that intersect.

Two axially spaced annular fins 252, 254 extend radially outward from the intermediate portion 234 and are skewed in a direction parallel to the axis A. The fin 254 is axially spaced from the axial face 248 and further defines an annular groove or pocket 256 in the radial face 250 between the fin 254 and the step 242. The profile of the fin 254 defines an axially elongated base 258 with a radially outwardly curving fin body 260 that terminates at a rounded tip 263. The other fin 252 is axially spaced from the fin 254 toward the insert portion 236 and has a similar profile to the fin 254. Another annular groove 262 is formed between the fins 252, 254.

In the example embodiment, the fin 252 closest to the rounded tip surface 270 impedes the medium within the pipe 14 from excessive interaction (e.g., turbulence) with the end seal 140 that is seated adjacent to the pocket 256 in the finned insert 142, which may degrade the sealing edge of the end seal 140. The other fin 254 is configured to help position and restrain the end seal 140 proximate the pocket 256 during installation of the pipe 14. While not shown, another washer-shaped seal (e.g., made of exfoliated graphite) may be positioned between the end face 238 of the finned insert 142 and the inner axial face 156 of the bore 144 in the end plate 22. Furthermore, the specific profile, locations, and number of fins can be adapted given the specific application requirements.

The insert portion 236 of the finned insert 142 is a generally cylindrical collar having an annular outer surface 264 and an annular inner surface 266. The insert portion 236 is radially thinner than the base portion 232. The outer surface 264 and the inner surface 266 are generally parallel over a segment of the insert portion 236. The outer surface 264 includes a tapered portion 268 that begins to taper radially inward relative to the inner surface 266 as the outer surface 264 extends toward a rounded tip surface 270.

Figure 4:
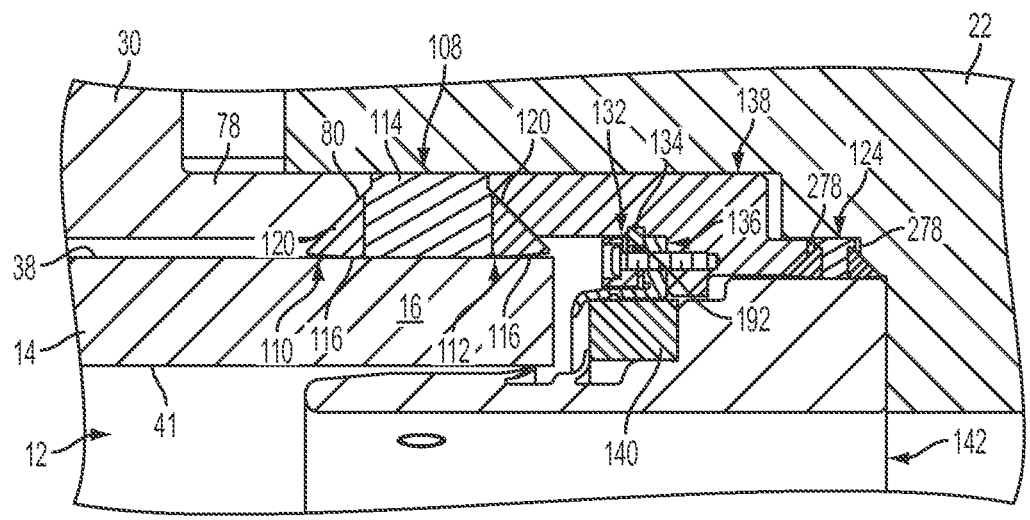

As best shown in FIG. 4, the rounded tip surface 270 and the tapered portion 268 aid the insertion of the finned insert 142 into the cut end 16 of the pipe 14 and help accommodate tolerances and irregularities in the geometry of the pipe 14 (e.g., out of round, wall thickness variations). Additionally, the tapered portion 268 centers the finned insert 142 relative to the pipe 14 during installation.

The end seal 140 is an annular ring having a rectangular cross section. The end seal 140, as noted above, is positioned adjacent to the pocket 256 and the fin 252 of the finned insert 142, and is adjacent to the cylindrical collar portion 198 and the annular lip portion 202 of the end fin insert 136. The end seal 140 is made of a malleable, compressible material, such as exfoliated graphite.

The overall form factor and installed configuration of the end seal assembly 12 is configured to minimize the reduction and impediment of the interior cross section of the pipe 14, such that the capacity of the repaired pipeline is reduced only slightly, if at all. The twin seal insert 138, the end fin insert 136, and the finned insert 142 are preferably made of a carbon steel having a yield strength on the order of 450 megapascals. Furthermore, each component may be coated (e.g., plated) to be chemically compatible with the mating components. The various malleable seals are preferably made of exfoliated graphite.

The dynamic installation and engagement of the example pipe end seal assembly 12 is illustrated in FIGS. 3-6. In FIG. 3, the insert portion 236 of the finned insert 142 has been partially inserted into the pipe 14 adjacent to an axial end face 18 of the pipe 14. The insert portion 236 is beginning to help align the pipe 14 and the pipe end seal assembly 12. The end face 18 of the pipe is beginning to engage the fin 252. The primary seal assembly 108 and the plate seal assembly 124 have not been energized.

Turning to FIG. 4, the primary ring 30 has been moved axially rightward (as viewed in FIG. 4) causing the primary seal assembly 108 and the end plate seal assembly 124 to be partially compressed. Specifically, the anti-extrusion ring 110 is wedged against the primary finger 78 of the primary ring 30, and the anti-extrusion ring 112 is wedged against the beveled face 162 of the twin seal insert 138. The anti-extrusion rings 110, 112 are urged radially inward and radially compressed as the primary seal member 114 is axially compressed. The primary seal member 114 is allowed to expand radially outward and inward to fill voids and engage the exterior surface 38 of the pipe.

The plate seal assembly 124 is similarly compressed as the anti-extrusion ring 126 is wedged against the engagement face 174 of the finger 172 of the twin seal insert 138, and the other anti-extrusion ring 128 is wedged against the skewed surface 154 of the bore 144 formed in the end plate 22. The anti-extrusion rings 126, 128 are driven radially inward and the plate seal member 130 is compressed axially and expands radially with the adjacent voids 278.

The axial end face 18 of the pipe 14 has deformed the fin 252. Specifically, the fin 252 is bent radially inward and along the direction of the central axis A.

Figure 5:
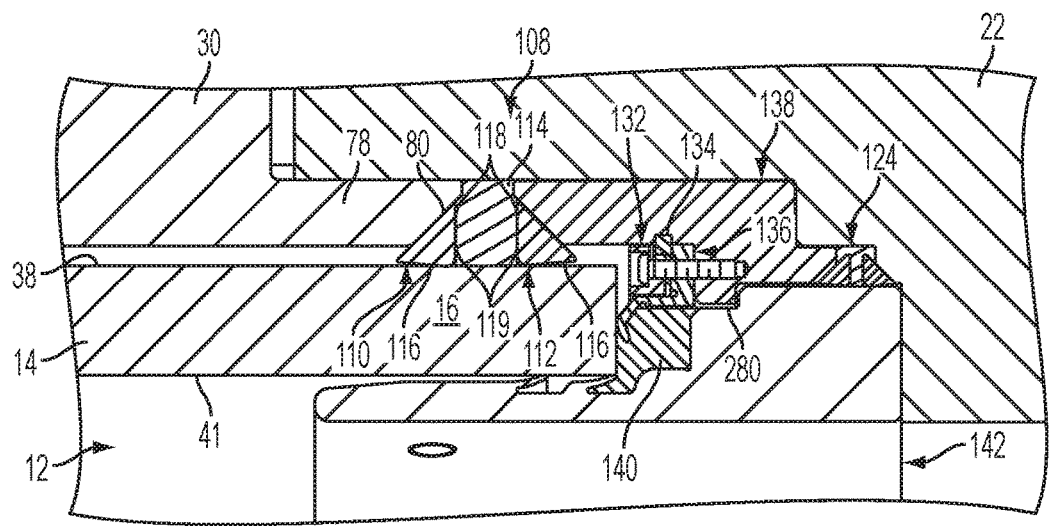

Next, in the configuration illustrated in FIG. 5, the primary ring 30 has been moved further axially rightward abutting the end face 170 of the twin seal insert 138 with the axial face 150 of the bore 144. The movement results in the primary seal assembly 108 and the plate seal assembly 124 being fully compressed such that the primary seal member 114 is axially compressed between the anti-extrusion rings 110, 112, the primary finger 78 of the primary ring 30, and the twin seal insert 138. The malleable, exfoliated graphite primary seal member 114 is compressed to increase the effective density of the primary seal member 114 and to form a seal that inhibits the passage of medium.

Similarly, plate seal member 130 is axially compressed between the anti-extrusion rings 126, 128, the end plate 22, and the twin seal insert 138. The malleable, exfoliated graphite plate seal member 130 is compressed to increase the effective density of the plate seal member 130 and to form a seal that inhibits passage of medium. In the configuration shown, the primary seal assembly 108 and the end plate seal assembly 124 will inhibit the environment (e.g., seawater) from reaching and degrading the unprotected axial end face 18 of the pipe 14.

The axial end face 18 of the pipe 14 continues to deform the fin 252 radially inward and axially, and the fin 254 is similarly deformed by the pipe 14. The end face 18 of the pipe 14 also engages the end fin insert 136. Specifically, the end face 18 of the pipe 14 engages the annular lip portion 202 and begins to deform the lip portion 202 radially inward and axially about the recess 214 formed in the inner surface 212 between the collar portion 198 and the lip portion 202. The end face 18 and the deformation of the end fin insert 136 begin to urge the malleable, exfoliated graphite end seal 140 to flow into both the pocket 256 of the finned insert 142 and toward the void 280 between the end fin insert 136, the twin seal insert 138, and the finned insert 142.

Figure 6:
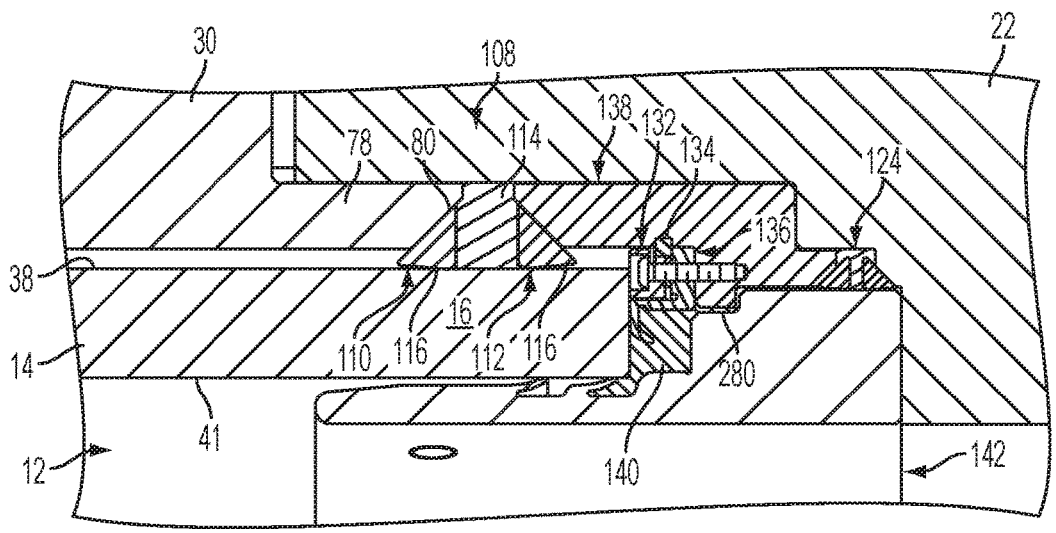
Figure 9:
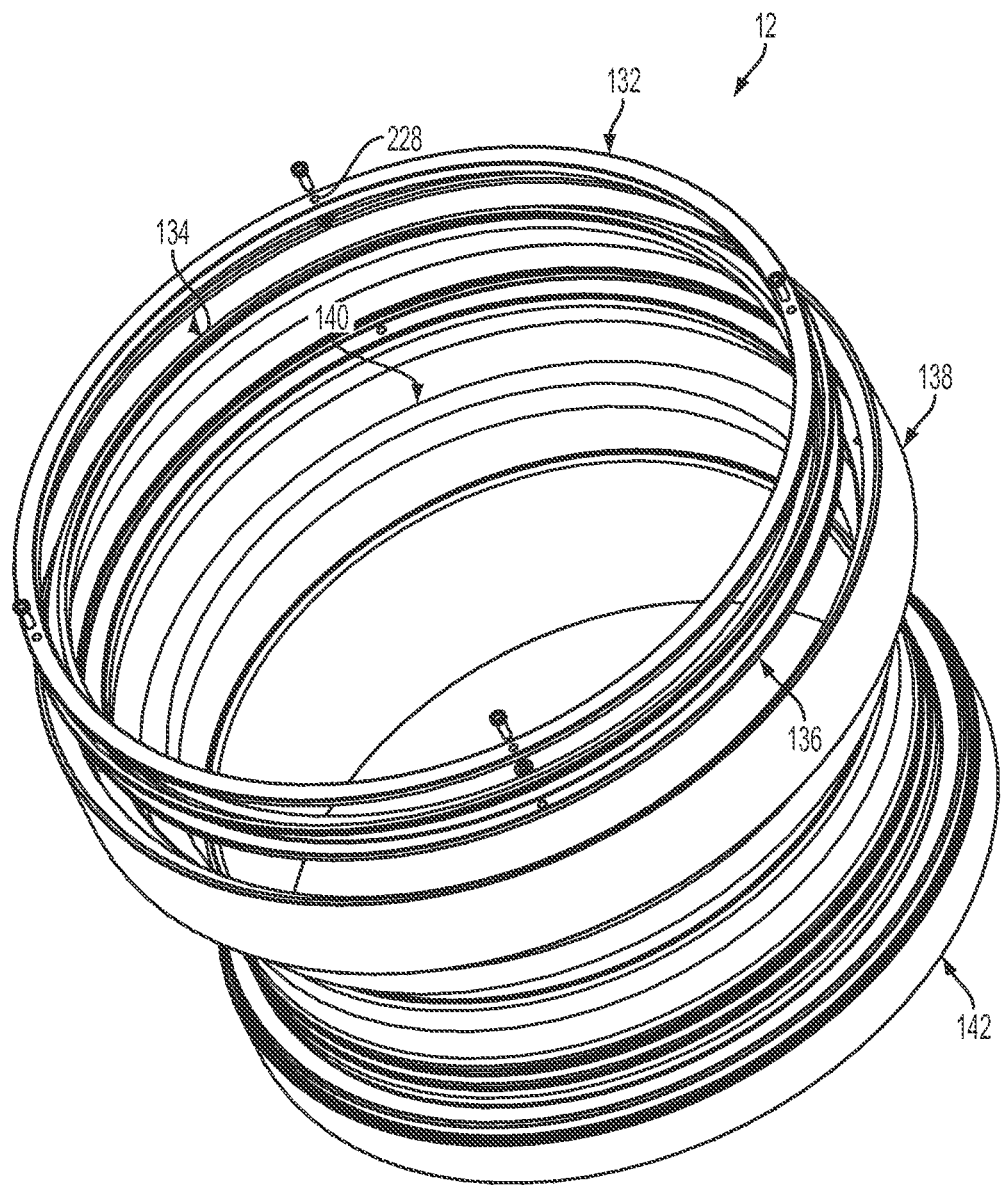
FIG. 9 is an exploded isometric view of the example pipe end seal assembly shown in FIG. 8.

Turning to FIG. 6, the axial end face 18 of the pipe 14 is fully engaged with the pipe end seal assembly 12. The end face 18 of the pipe 14 abuts the packing ring retainer 132 and has deformed the fin 254 into engagement with the interior surface 41 of the pipe 14 at a location that is axially spaced from the axial end face 18 of the pipe 14. The axial end face 18 of the pipe 14 continues to engage and deform the annular lip portion 202 radially inward and axially generally about the recess 214. The lip portion 202 is approximately perpendicular as viewed in cross section to the collar portion 198. An outer surface 216 of the lip portion 202 is engaged with the end face 18 of the pipe 14, and the distal end of the lip portion 202 is surrounded by the end seal 140. In addition, the end seal 140 is also urged and compressed into the pocket 256 and continues to fill the void 280 between the end fin insert 136, the twin seal insert 138, and the finned insert 142.

The positioning of the axial end face 18 of the pipe 14 is such that the medium within the pipe 14 is inhibited from accessing the end face 18 by the fin 252 adjacent to the interior surface 41 of the pipe 14. Furthermore, the fin 254 is also adjacent to the interior surface 41 and inhibits the passage of medium. Moreover, the fin 254 is supported by the end seal 140 that is compressed within and adjacent to the pocket 256. Lastly, the end seal 140 has been urged into direct engagement with the axial end face 18 and wraps around the end face 18 to engage the interior surface 41 of the pipe 14. Thus, even if a portion of the CRA is damaged during the cutting operation on the pipe 14 (the CRA is typically approximately 3 mm thick), the bare material of the pipe 14 is protected from medium within the pipe 14 by the configuration of the pipe end seal assembly 12.

Therefore, the combination of the primary seal assembly 108, the plate seal assembly 124, and the pipe end seal assembly 12, the axial end face 18 of the pipe 14 is sealed from both external environmental medium and internal medium within the pipe 14.

Figure 10:
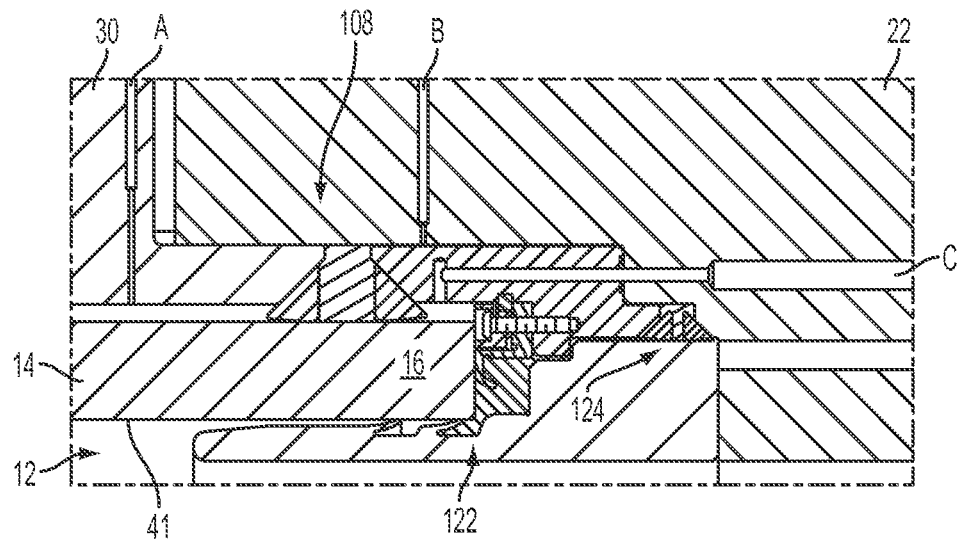
FIGS. 10 and 11 are partial section views illustrating various seal check ports formed in the example pipe end connector assembly.
Figure 11:
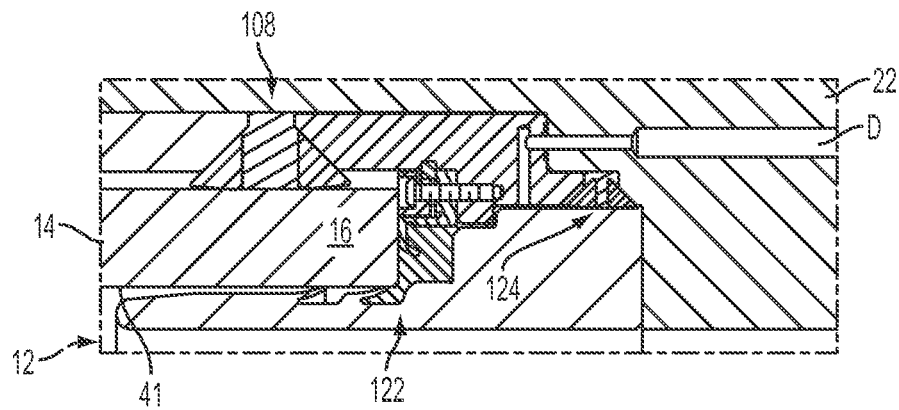

The example connector assembly 10 includes a series of ports that can be used to pressure test the various seal boundaries established by the primary seal assembly 108, the secondary seal assembly 74, the plate seal assembly 124, and the pipe end seal assembly 12. As shown in FIGS. 10 and 11, test ports A, B, C, and D are illustrated at various locations within connector assembly 10. While not shown, one or more dowel pins can be used to ensure that the appropriate relative rotational position between the adjacent components is achieved, such that the port passageways are properly aligned.

Port A can be pressurized to confirm the integrity of the primary seal assembly 108 and the secondary seal assembly 74. Port B can be pressurized to confirm the integrity of the primary seal assembly 108 and the plate seal assembly 124. Port C can be pressurized to confirm the integrity of the primary seal assembly 108 and the pipe end seal assembly 12. Lastly, port D can be pressurized to confirm the integrity of the pipe end seal assembly 12 and the plate seal assembly 124.

Given the benefit provided by this disclosure, one of ordinary skill in the art will appreciate the various modifications and alterations within the scope of the fundamental concepts. While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

We claim:

1. An end seal assembly configured to seal with a pipe, the pipe having an axial end face and an inner surface, the seal assembly comprising:
   a cylindrical finned insert including an insert portion to be received in the pipe along an axis and a base portion, the base portion having a base surface extending transverse to the axis, and at least partially facing and axially aligned with the end face of the pipe when inserted into the pipe, the insert portion having an insert surface extending along the axis and at least one annular fin extending radially outwardly from the insert surface, a pocket being formed between the at least one annular fin and the base portion, the insert surface defining a radial inner surface of the pocket, the at least one annular fin being deformable against the inner surface of the pipe, the base surface extending radially outwardly beyond the at least one annular fin; and
   a malleable annular end seal positioned between the base surface and the at least one annular fin and spaced from the insert surface, a portion of the end seal being radially outwardly beyond the at least one annular fin, the end seal being axially compressed between the base portion and the end face of the pipe, the end seal having at least another portion flowing around the end face to the inner surface of the pipe, filling the pocket, and engaging the insert surface.

2. The seal assembly of claim 1, further comprising a cylindrical end fin insert positioned radially outwardly of the pocket, the end fin insert including an annular lip extending axially and radially inwardly, the lip being deformed by the end face in an axially and radially inward direction.

3. The seal assembly of claim 2, wherein the end fin insert further includes a cylindrical portion and an annular recess between the annular lip and the cylindrical portion, the annular recess providing a pivot for the annular lip.

4. The seal assembly of claim 2, wherein the annular lip has an outer surface and is deformable to a radial orientation in which the outer surface of the annular lip engages the end face of the pipe.

5. The seal assembly of claim 2, wherein the annular lip has a distal end and is deformable to a position in which the distal end is surrounded in the end seal.

6. The seal assembly of claim 2, wherein the end seal is retained between the annular lip and the finned insert.

7. The seal assembly of claim 2, further comprising a seal insert positioned radially outwardly from the finned insert and from the end fin insert.

8. The seal assembly of claim 7, wherein the end fin insert is coupled to the seal insert.

9. The seal assembly of claim 7, wherein the seal insert is axially movable relative to the finned insert.

10. The seal assembly of claim 7, wherein an annular void is defined between a portion of the seal insert and the finned insert, the end seal being compressed and flowing into the annular void.

11. The seal assembly of claim 1, wherein the finned insert includes a plurality of axially-spaced apart annular fins, the annular fins being deformable against the inner surface of the pipe.

12. The seal assembly of claim 1, wherein the base has a stepped surface extending from the insert surface, the stepped surface having an axially-extending surface portion connected between transversely-extending surface portions, and wherein the at least a portion of the end seal is positioned on the axially-extending surface portion spaced from the insert surface.

13. The seal assembly of claim 12, wherein the axially-extending surface portion is positioned radially outwardly of the at least one annular fin in a deformed condition of the at least one annular fin.

14. A pipe end connector assembly for a pipe, the pipe having an outer surface, an inner surface and an axial end face, the connector assembly being configured to mount to the outer surface of the pipe near the end face of the pipe, the connector assembly comprising:
 a cylindrical connector body including at least one gripping segment configured to selectively mount to the outer surface of the pipe;
 a first end plate and a second end plate positioned at opposite ends of the connector body;
 a tension member coupled to the first end plate and the second end plate and being operable to draw the first end plate and the second end plate to mount the at least one gripping element to the pipe; and
 an end seal assembly configured to seal with the pipe, the seal assembly including
  a cylindrical finned insert including an insert portion to be received in the pipe along an axis and a base portion, the base portion having a base surface extending transverse to the axis, and at least partially facing and axially aligned with the end face of the pipe when inserted into the pipe, the insert portion having an insert surface extending along the axis and at least one annular fin extending radially outwardly from the insert surface, a pocket being formed between the at least one annular fin and the base portion, the insert surface defining a radial inner surface of the pocket, the at least one annular fin being deformable against the inner surface of the pipe, the base surface extending radially outwardly beyond the at least one annular fin, and
  a malleable annular end seal positioned between the base surface and the at least one annular fin and spaced from the insert surface, a portion of the end seal being radially outwardly beyond the at least one annular fin, the end seal being axially compressed between the base portion and the end face of the pipe, the end seal having at least another portion flowing around the end face to the inner surface of the pipe, filling the pocket, and engaging the insert surface.

15. The connector assembly of claim 14, wherein the seal assembly further includes a cylindrical end fin insert positioned radially outwardly of the pocket, the end fin insert including an annular lip extending axially and radially inwardly, the end seal is retained between the annular lip and the finned insert, the lip being deformed by the end face in an axially and radially inward direction.

16. The connector assembly of claim 15, wherein the end fin insert further includes a cylindrical portion and an annular recess between the annular lip and the cylindrical portion, the annular recess providing a pivot for the annular lip.

17. The connector assembly of claim 15, wherein the annular lip has an outer surface and a distal end, the annular lip being deformable to a radial orientation in which the outer surface of the annular lip engages the end face of the pipe and in which the distal end is surrounded in the end seal.

18. The connector assembly of claim 15, wherein the seal assembly further includes a seal insert positioned radially outwardly from the finned insert, the end fin insert being coupled to the seal insert, the seal insert and the end fin insert being axially movable relative to the finned insert.

19. The connector assembly of claim 18, wherein an annular void is defined between a portion of the seal insert and the finned insert, the end seal being compressed and flowing into the annular void.

20. The connector assembly of claim 14, wherein the finned insert includes a plurality of axially-spaced apart annular fins, the annular fins being deformable against the inner surface of the pipe.

21. The connector assembly of claim 14, further comprising a primary seal engaged with the connector body and positioned between the end seal assembly and the second end plate, the primary seal being configured to abut and seal with the outer surface of the pipe and the connector body.

22. The connector assembly of claim 14, wherein the base has a stepped surface extending from the insert surface, the stepped surface having an axially-extending surface portion connected between transversely-extending surface portions, and wherein the at least a portion of the end seal is positioned on the axially-extending surface portion spaced from the insert surface.

23. The connector assembly of claim 22, wherein the axially-extending surface portion is positioned radially outwardly of the at least one annular fin in a deformed condition of the at least one annular fin.

24. A pipe end connector assembly for a pipe, the pipe having an outer surface and an axial end face, the connector assembly being configured to mount to the outer surface of the pipe near the end face of the pipe, the connector assembly comprising:
 a cylindrical connector body including at least one gripping segment configured to selectively mount to the outer surface of the pipe;
 a first end plate and a second end plate positioned at opposite ends of the connector body;
 a tension member coupled to the first end plate and the second end plate and being operable to draw the first end plate and the second end plate to mount the at least one gripping element to the pipe;

an end seal assembly configured to seal with the pipe, the seal assembly including
- a cylindrical finned insert including an insert portion to be received in the pipe and a base portion at least partially facing the end face of the pipe, the insert portion having at least one annular fin extending radially outwardly, a pocket being formed between the at least one annular fin and the base portion, the at least one annular fin being deformable against the inner surface of the pipe, and
- a malleable annular end seal positioned near the pocket, the end seal being axially compressed between the base portion and the end face of the pipe and flowing around the end face to the inner surface of the pipe and into the pocket to inhibit fluid from passing from the inner surface of the pipe to the end face of the pipe; and
- a primary seal engaged with the connector body and positioned between the end seal assembly and the second end plate, the primary seal being configured to abut and seal with the outer surface of the pipe and the connector body;

wherein the primary seal includes a primary seal member and a primary seal ring having an angled surface, and wherein the seal assembly further includes a seal insert positioned radially outwardly from the finned insert, the seal insert having a beveled surface engageable with the angled surface of the primary seal ring to radially compress the primary seal ring and thereby the primary seal member.

25. The connector assembly of claim 24, further comprising a plate seal assembly engageable between the first end plate and the base portion of the finned insert, the plate seal assembly including a plate seal member and a plate seal ring having an angled surface, the seal insert having an angled engagement face engageable with the angled surface of the plate seal ring to radially compress the plate seal ring and thereby the plate seal member.

26. A pipe assembly comprising:
a pipe having an axial end face and an inner surface; and
an end seal assembly configured to seal with the pipe, the end seal assembly including
- a cylindrical finned insert including an insert portion to be received in the pipe and a base portion at least partially facing and axially aligned with the end face of the pipe when inserted into the pipe, the insert portion having at least one annular fin extending radially outwardly, a pocket being formed between the at least one annular fin and the base portion, the at least one annular fin being deformable against the inner surface of the pipe; and
- a malleable annular end seal positioned near the pocket, the end seal having at least a portion axially between the base portion and the end face of the pipe and being axially compressed between the base portion and the end face of the pipe, the end seal having at least a portion flowing radially inward and axially toward the pipe, wherein the at least a portion flowing around the end face to the inner surface of the pipe and filling the pocket to inhibit fluid from passing from the inner surface of the pipe to the end face of the pipe.

27. The pipe assembly of claim 26, wherein the pipe has an outer surface, and wherein the pipe assembly further comprises:
- a cylindrical connector body including at least one gripping segment configured to selectively mount to the outer surface of the pipe;
- a first end plate and a second end plate positioned at opposite ends of the connector body;
- a tension member coupled to the first end plate and the second end plate and being operable to draw the first end plate and the second end plate to mount the at least one gripping element to the pipe.

* * * * *